United States Patent [19]

Williams et al.

[11] 3,958,379
[45] May 25, 1976

[54] APPLIANCE FOR LINEAR BODIES

[75] Inventors: Harrison L. Williams, Euclid; Detre M. Banhidy, Lakewood, both of Ohio

[73] Assignee: Preformed Line Products Company, Cleveland, Ohio

[22] Filed: Nov. 6, 1974

[21] Appl. No.: 521,331

[52] U.S. Cl. .............................. 52/145; 24/16 PB
[51] Int. Cl.² ........................................ E04H 17/22
[58] Field of Search ............ 52/147, 148; 24/16 PB, 24/30.5 P; 61/54

[56] References Cited
UNITED STATES PATENTS

| | | | |
|---|---|---|---|
| 711,949 | 10/1902 | Dollison | 135/37 |
| 1,934,872 | 11/1933 | Morgan | 24/30.5 P |
| 3,009,437 | 11/1961 | Hollinger | 52/147 |
| 3,057,443 | 10/1962 | Schlein | 52/147 |
| 3,302,346 | 2/1967 | Williams | 52/147 |
| 3,321,924 | 5/1967 | Liddel | 61/54 |
| 3,466,077 | 9/1969 | Moberg | 24/16 BP |
| 3,501,814 | 3/1970 | Anderson | 24/16 BP |
| 3,742,559 | 7/1973 | Panako | 248/74 PB |

FOREIGN PATENTS OR APPLICATIONS 1,418,989    3/1966    France............................ 24/30.5 P

*Primary Examiner*—Ernest R. Purser
*Assistant Examiner*—Henry Raduazo
*Attorney, Agent, or Firm*—Hume, Clement, Brinks, Willian, Olds & Cook, Ltd.

[57] ABSTRACT

An improved, helix appliance for linear bodies has a locking means disposed at one end thereof to impede removal of the appliance from the linear body by unauthorized persons. The locking means includes a strap which encircles the appliance at the end adjacent to the dead end or other anchoring device. When the appliance is slid on the linear body over the dead end attached to the anchoring device, it expands and engages the encircling locking means thereby requiring tools to effect its removal.

8 Claims, 9 Drawing Figures

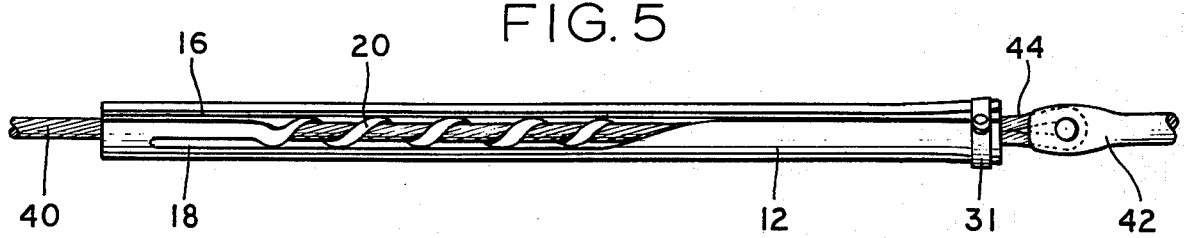
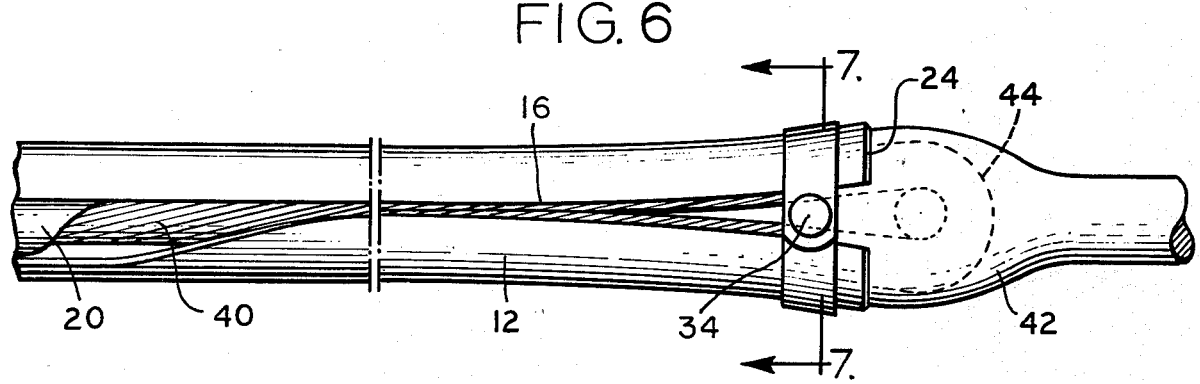
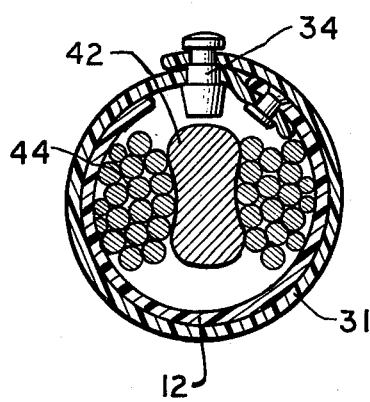
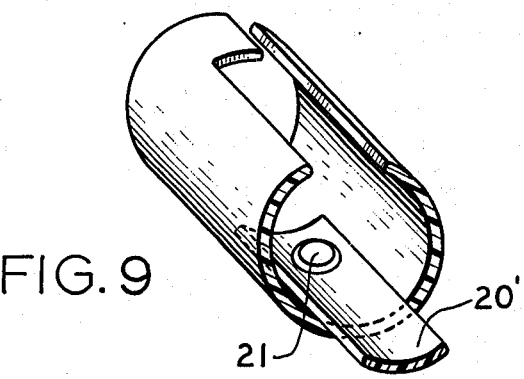
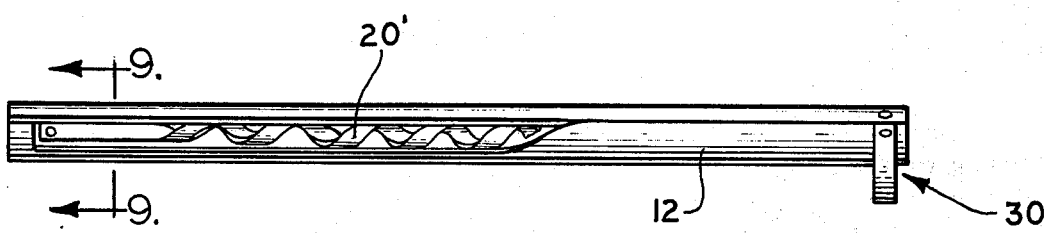

APPLIANCE FOR LINEAR BODIES

BACKGROUND OF THE INVENTION

This invention pertains to an appliance for linear bodies such as guy-wires, cables, conductors and the like. The appliance is placed in enclosing engagement on the linear body so as to indicate the presence of the linear body and to isolate the same from its immediate surroundings. More particularly, the invention pertains to an improved appliance which cannot be removed from the linear body by hand without the use of additional tools.

Tubular guard members which are adapted to be placed over a suspended linear body are known to the prior art. For example, U.S. Pat. No. 3,302,346 issued to Williams et al shows an elongated tubular guard having an integral helix which surrounds and engages the linear body to hold the guard member in place. One of the negative aspects of the integral helix guard member, however, is that it may be removed from the linear body with relative ease by children or others tampering with the device.

SUMMARY OF THE INVENTION

The improved appliance of the present invention obviates the problems associated with the prior art devices through the utilization of a locking means which is disposed at one end of the tubular guard member and which securly holds the tubular guard member in mounted disposition on the linear body. The locking means may be easily and quickly engaged while installing the guard member on the linear body, yet when placed in its final engaging position the locking means and the tubular guard member may not be removed by hand without the use of additional tools. In this manner, the improved appliance of the present invention is rendered substantially tamper proof and the deleterious effects associated therewith are avoided.

BRIEF DESCRIPTION OF THE DRAWINGS

The novel features of the present invention are set forth with particularity in the appended claims. However, the invention together with further objects and advantages thereof may be best understood by reference to the following description taken in conjunction with the accompanying drawings in which like reference numerals identify like elements and in which:

FIGS. 4 and 5 are side elevational views illustrating the installation of the improved appliance on a linear body;

FIG. 6 is an enlarged side elevational view showing the improved appliance of the present invention in the final, locked position after installation is completed;

FIG. 7 is an enlarged cross-sectional view taken along lines 7—7 of FIG. 6;

FIG. 8 is a side-elevational view showing an alternative embodiment of the improved appliance; and FIG. 9 is an enlarged perspective view taken along line 9—9 of FIG. 7, illustrating in greater detail the alternative fastening of the helical gripping means to the tubular body.

DETAILED DESCRIPTION OF THE INVENTION

Figure 1:
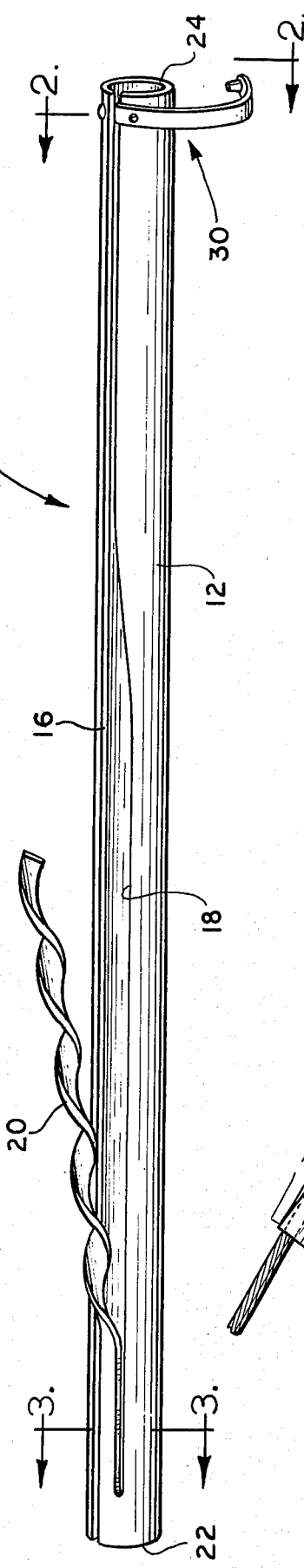
FIG. 1 is a perspective view of the improved appliance of the present invention illustrating at one end the helical gripping means and at the other end a suitable locking means.

Referring now to FIG. 1, the improved appliance designated generally as 10, includes a tubular member 12, having a first slit 16 extending its entire length and a second slit 18 extending only a portion of its length. The tubular member also includes a portion 20 which is adapted to flexibly displace between the slits 16 and 18 and which is helically preformed to an internal diameter and a pitch length which permits wrapping engagement about a linear body. At the end 24, toward which the preformed portion 20 extends, the tubular member 12 has disposed thereon a locking means designated generally as 30 which when engaged will hold the tubular member 12 in securly mounted disposition on a suitable linear body.

Figure 2:
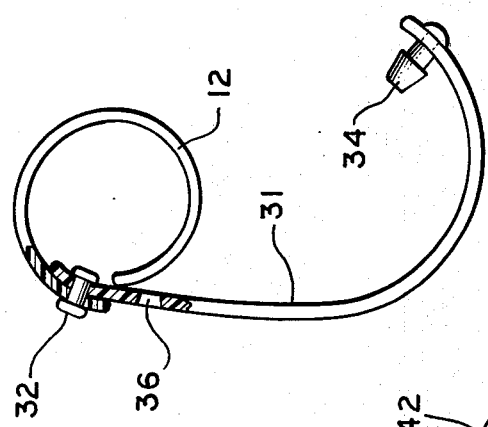
FIG. 2 is an enlarged end view, in partial cross-section, taken along line 2—2 of FIG. 1, illustrating the improved appliance with the locking means in the open, unlocked position.

In accordance with one embodiment of the present invention, and as is clearly shown in FIG. 2, the locking means 30 includes an elongated strap 31 having one end fixedly secured to the tubular member 12 and a free end which extends therefrom. The strap 31 has a fastening element 34 at its free end and an aperture 36 which is positioned so as to align and engage the fastening element 34 when the strap is wrapped circumferentially about the tubular member 12 while the tubular member is in a non-expanded condition. Preferably, strap 31 is secured to the inside surface of tubular member 12 adjacent to slit 16 by means of a rivet 32.

Figure 4:
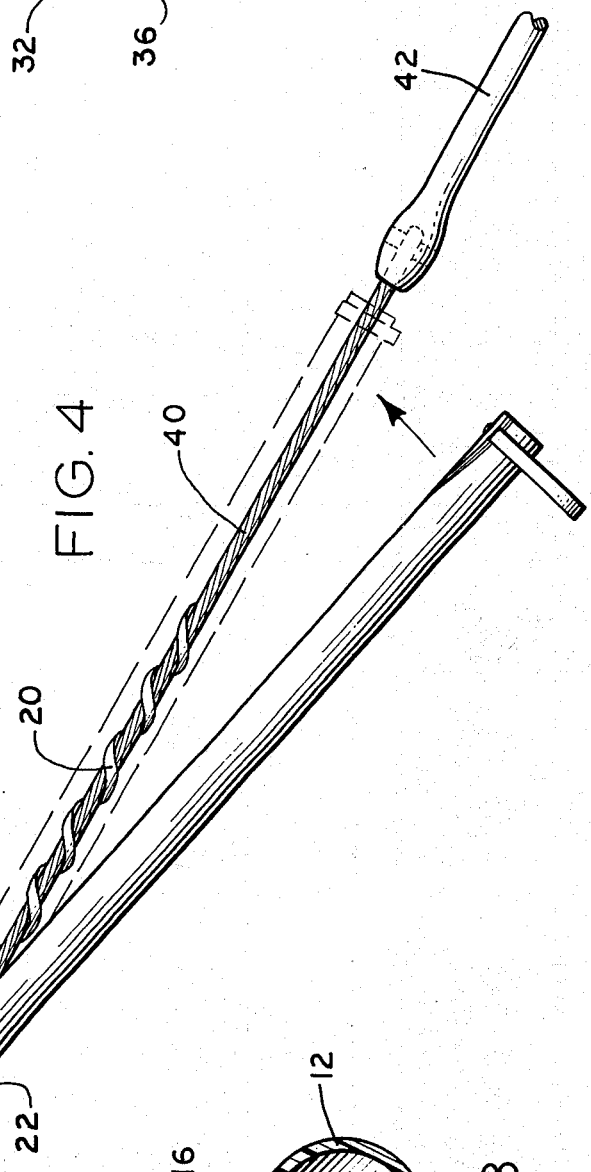
Figure 3:
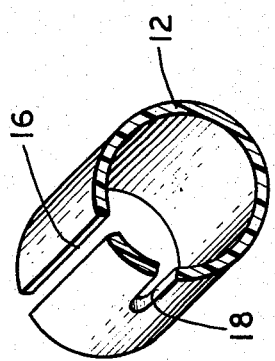
FIG. 3 is an enlarged perspective view taken along line 3—3 of FIG. 1, showing in greater detail the end of the improved appliance opposite to the locking means.

The improved appliance of the present invention is characterized by its simplicity, economy, reliability, and particularly by its ease of installation. FIGS. 4 and 5 illustrate the method for installation of the improved appliance 10 when used in conjunction with a guy-wire 40. Typically, the guy-wire 40 is utlized under tension loan to assist in the support of a standing structure (not shown). At the end of the guy-wire 40 opposite to this structure an anchoring device or stake 42 is utilized to maintain the guy-wire in tension. The guy-wire 40 is securly fastened to the anchor stake 42 by means of a helically preformed dead end 44 which loops through the eye of the anchor stake 42.

Referring now to FIGS. 4, 5, and 6 there are shown the various stages of installation of the improved appliance 10. The first stage of installation is to place end 22 of the tubular member 12 onto the wire 40. The tubular member 12 is then canted so that the wire 40 extends through the space intermediate the slits 16 and 18. The preformed strip 20 is then wrapped around the portion of the wire 40 extending therethrough. When the wrapping is completed the end 24 of the tubular member 12 is forced in the direction of the arrow so that the wire 40 and the helical strip 20 are moved within the interior of the tubular member 12. In this manner the guy-wire 40 is disposed within the improved appliance 10 in substantially coaxial alignment.

In the preferred form, the space intermediate the slits 16 and 18 is substantially less in width than the diameter of the wire 40 or at least the combined diameter of the wire 40 with a strip 20 wrapped thereon. Thus, in order for the wire 40 to be forced into the tubular member 12, or withdrawn therefrom, the sides of the tube must be resiliently expanded. This will prevent the wire 40 from being withdrawn inadvertently from the tubular member 12 once it is disposed within the entire length thereof.

Once the tubular member 12 has been mounted in coaxial alignment on the guy-wire 40 the locking means 30 is engaged, as is shown in FIG. 5. This is accomplished by wrapping the elongated strap 31 circumferentially about the end 24 of the tubular member 12 while the same is in a non-expanded condition. In this arrangement the fastening element 34 may be easily snapped into aperture 36. The appliance 10 is then placed into final locking position by sliding the tubular member 12 so that end 24 extends over the divergent portion of dead end 44 and adjacent to the knob-like end of anchor stake 42. In this manner, forces are applied to the end 24 which tend to expand the tubular member 12 along slit 16. However, the strap 31 of the locking device limits the expansion and develops tension forces which concentrate about the fastening element 34 and aperture 36. Moreover, due to the nature of the gripping engagement of the preformed helical strip 20 about the guy-wire 40 it is very difficult to slide the tubular member 12 in the opposite direction away from the dead end 44 and the anchor stake 42.

It will be apparent from the foregoing, that while the improved appliance may be easily and quickly installed upon a linear body it will be most difficult to remove the appliance from that body without the assistance of hand tools.

FIGS. 8 and 9 illustrate an alternative embodiment of the present invention wherein the preformed helical strip 20' is fastened to the interior of the tubular body 12 by a suitable fastening means, for example rivet 21. This alternative embodiment provides additional advantages in that the preformed helical strip 20' may be constructed from a material different from that of the tubular body 12. Moreover, having the preformed helical strip 20' positioned within the tubular body 12 provides substantially improved coaxial alignment between the linear body and the appliance thereby lessening the stresses and potential for structural fatigue at the end of the preformed helical strip 20' which is fastened to the tubular body 12. It is also contemplated by the present invention that the preformed helical strip 20 of the embodiment illustrated in FIG. 1 may also be constructed of material different from that of the tubular body 12. Therefore, the helical strip 20 would be positioned as is shown in FIG. 1 but would be attached to the tubular member by a suitable fastening means rather than as an integral portion thereof. Of course, these alternative embodiments function and are installed in the same manner as is the improved appliance illustrated in FIG. 1.

While the improved appliance of the present invention may be constructed of plastic, metal or other flexible materials, it is preferred that the device be manufactured from a polyethylene plastic material. A particularly preferred combination of materials comprises the use of polyethylene for the tubular member 12 and the use of polyvinal chloride for the preformed helical strip 20' illustrated in the FIGS. 8 and 9. This combination allows the individual components of the improved appliance of the present invention to be constructed from materials which are particularly suitable for the specific function which they carry out. Moreover, while one embodiment of the present invention discloses the use of a rivet to fixedly secure strap 31 to the tubular member 12, any other method of attachment such as a staple, bolt, spring clip, or the like may be used. Likewise, the fastening element 34 may be constructed from aluminum, steel, plastic or other material so long as it has sufficient strength and resiliency to maintain its structural integrity when subjected to the tension and shearing forces encountered in its application.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such modifications and changes be covered by the following claims.

We claim:
1. An improved appliance for linear bodies comprising:
   a tubular member adapted to be mounted in generally coaxial alignment on a linear body;
   a helically preformed portion secured at one end to said tubular member and extending longitudinally therein in a first direction and having an internal diameter and pitch length comprising means to permit wrapped engagement with said linear body in slidable relationship therewith in said direction said helically preformed portion extends but in substantially non-slidable relationship in the opposite direction;
   said tubular member having a first slit extending its entire length and a second slit extending only a portion of its length generally coincident with said helically preformed portion, said first and second slits thereby forming a space through which said helically preformed portion may flexibly displace; and
   means disposed only at the end of said tubular member toward which said helically preformed portion extends for locking said tubular member in final mounted dispostion on said linear body, said locking means comprising means for limiting the circumferential expansion of said tubular member as said member is subjected to expanding forces in said final mounting disposition.

2. The improved appliance of claim 1 wherein said expansion limiting means includes an elongated strap having one end fixedly secured to said tubular member and a free end, said strap also having a fastening element disposed at said free end and an aperture positioned to align and engage said fastening element when said strap is wrapped about the tubular member in a non-expanded condition.

3. The improved appliance of claim 1 wherein said helically preformed portion comprises an integral portion of the wall of said tubular member,
   said integral portion being defined by said first and second slits.

4. The improved appliance of claim 1 wherein said helically preformed portion is disposed within and secured to the interior of said tubular member, thereby providing improved coaxial alignment between said linear body and said tubular member.

5. The combination comprising a linear body having a divergent dead end secured to an anchoring means and a tubular guard member mounted in generally coaxial alignment on said linear body adjacent to said anchoring means;

said tubular member having a helically preformed portion secured at one end thereto and extending therein in a first direction toward said divergent dead end and having an internal diameter and pitch length comprising means to permit wrapped engagement with said linear body in slidable relationship therewith in said direction said helically preformed portion extends but in substantially non-slidable relationship in the opposite direction;

said tubular member having a first slit extending its entire length and a second slit extending only a portion of its length generally coincident with said helically preformed portion, said first and second slits thereby forming a space through which said helically preformed portion may flexibly displace; and means disposed only at the end of said tubular member toward which said helically preformed portion extends for locking said tubular member in mounted disposition on said linear body, said locking means including means for limiting the circumferential expansion of said end as it is positioned over said divergent dead end and subjected to expanding forces thereby.

6. The combination of claim 1 wherein said expansion limiting means includes an elongated strap having one end fixedly secured to said tubular member and a free end, said strap also having a fastening element disposed at said free end and an aperture positioned to align and engage said fastening element when said strap is wrapped about the tubular member in a non-expanded condition.

7. The combination of claim 1 wherein said helically preformed portion comprises an integral portion of the wall of said tubular member.

8. The combination of claim 1 wherein said helically preformed portion is disposed within and secured to the interior of said tubular member, thereby providing improved coaxial alignment between said linear body and said tubular member.

* * * * *

UNITED STATES PATENT AND TRADEMARK OFFICE
CERTIFICATE OF CORRECTION

PATENT NO. : 3,958,379
DATED : May 25, 1976
INVENTOR(S) : Williams et al

It is certified that error appears in the above-identified patent and that said Letters Patent are hereby corrected as shown below:

In the first line of claims 6, 7 and 8, "claim 1" should read --claim 5--.

Signed and Sealed this

Thirtieth Day of November 1976

[SEAL]

Attest:

RUTH C. MASON
*Attesting Officer*

C. MARSHALL DANN
*Commissioner of Patents and Trademarks*